US011903107B2

(12) United States Patent
Hikmet et al.

(10) Patent No.: US 11,903,107 B2
(45) Date of Patent: Feb. 13, 2024

(54) CONTROLLER FOR A LIGHTING SYSTEM

(71) Applicant: SIGNIFY HOLDING B.V., Eindhoven (NL)

(72) Inventors: Rifat Ata Mustafa Hikmet, Eindhoven (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 179 days.

(21) Appl. No.: 17/605,216

(22) PCT Filed: Apr. 20, 2020

(86) PCT No.: PCT/EP2020/060957
§ 371 (c)(1),
(2) Date: Oct. 20, 2021

(87) PCT Pub. No.: WO2020/216698
PCT Pub. Date: Oct. 29, 2020

(65) Prior Publication Data

US 2022/0225479 A1 Jul. 14, 2022

(30) Foreign Application Priority Data

Apr. 25, 2019 (EP) .................................... 19171162

(51) Int. Cl.
*H05B 45/20* (2020.01)

(52) U.S. Cl.
CPC .................................. *H05B 45/20* (2020.01)

(58) Field of Classification Search
CPC ...... H05B 45/10; H05B 45/20; H05B 45/335; H05B 45/325; H05B 45/33; H05B 45/30;
(Continued)

(56) References Cited

U.S. PATENT DOCUMENTS 10,104,741 B2 10/2018 Choi et al.
10,129,937 B1 * 11/2018 Lin ..................... H05B 45/335
(Continued)

FOREIGN PATENT DOCUMENTS

DE 102016223775 A1 6/2017
EP 2728972 A1 5/2014
(Continued)

*Primary Examiner* — Haissa Philogene

(57) ABSTRACT

A controller (110) for a lighting system (100) is provided. The controller is connectable to a plurality of light sources (120, 122) of different colors and/or different color temperatures, and to a user control element (130) configured to generate a user selected value from a range of user selectable values. The controller is configured to receive a change of the user selected value, and as a response to and corresponding to this change adjust a combined output of the plurality of light sources to produce a change in output color, color temperature and/or luminous flux of a combined light of the plurality of light sources. The change is such that, as function of the user selected value in separate first intervals of the user selectable values, the output color and/or color temperature is kept approximately constant while the luminous flux obtains a local minimum or local maximum in each first interval. Similarly, in at least one second interval in between the first intervals, the output color at least changes from a first color to a second color and/or the color temperature increases or decreases while the luminous flux is kept approximately constant. A lighting system including the controller, and a method of operating a lighting system having such a controller are also provided.

15 Claims, 6 Drawing Sheets

(58) Field of Classification Search
CPC .. H05B 45/3577; H05B 47/18; G06F 3/04847
See application file for complete search history.

(56) References Cited

U.S. PATENT DOCUMENTS

| | | | | |
|---|---|---|---|---|
| 10,299,321 | B1 * | 5/2019 | Trask | H05B 45/20 |
| 2009/0251066 | A1 * | 10/2009 | Baaijens | H05B 41/38<br>315/294 |
| 2012/0176063 | A1 * | 7/2012 | Hatley | H05B 45/20<br>315/297 |
| 2013/0182411 | A1 | 7/2013 | Cuppen et al. | |
| 2015/0359061 | A1 * | 12/2015 | Adler | H05B 47/16<br>315/153 |
| 2016/0120001 | A1 | 4/2016 | Clark et al. | |
| 2019/0086046 | A1 * | 3/2019 | Ganick | F21S 8/046 |

FOREIGN PATENT DOCUMENTS

| | | | |
|---|---|---|---|
| EP | 3457816 | A1 | 3/2019 |
| JP | 2017130416 | A | 7/2017 |
| JP | 2017157376 | A | 9/2017 |
| WO | 2015037358 | A1 | 3/2015 |
| WO | 2017189571 | A1 | 11/2017 |

* cited by examiner

CONTROLLER FOR A LIGHTING SYSTEM

CROSS-REFERENCE TO PRIOR APPLICATIONS

This application is the U.S. National Phase application under 35 U.S.C. § 371 of International Application No. PCT/EP2020/060957, filed on Apr. 20, 2020, which claims the benefit of European Patent Application No. 19171162.1, filed on Apr. 25, 2019. These applications are hereby incorporated by reference herein.

TECHNICAL FIELD

The present disclosure relates to a controller for adjusting the combined light from a plurality of light sources. In particular, the present disclosure relates to a controller for adjusting both the luminous flux, color temperature and/or the output color of the combined light using a single user control element.

BACKGROUND

With the advance of LED technology, lighting systems and lamps having variable color temperature and/or output color are finding an increased use both in professional and consumer environments. In such lighting systems, a desired color temperature may for example be obtained by combining the light from several light sources having different colors and/or color temperatures (CTs). For example, a white LED having a colder (blueish) color temperature may be combined with another white LED having a warmer (yellowish) color temperature, and by controlling the relative output of the two LEDs a combined light having a more neutral (e.g. somewhere in between cold and warm) color temperature may be produced.

In some environments, it may be desirable to control not only the color temperature (and/or output color), but also the intensity (luminous flux), of the output light. Control systems providing such control may however be complex and hard to use for the average user. There is therefore a need for a more flexible and easy way of controlling both the luminous flux, color temperature and/or output color of light.

In EP2728972A1 an approach for controlling operation of a first light source of a first color and a second light source of a second color is provided. The approach comprising receiving an input control signal having a user-controllable duration, switching, in response to a single input control signal having the overall duration not exceeding a first predetermined threshold, the first and second light sources on or off, and changing characteristics of light provided by the first and second light sources in response to the duration of an input control signal exceeding a second predetermined threshold that is no smaller than the first predetermined threshold, the change in characteristics being dependent on duration of the input control signal and the change comprising adjustment of the ratio between the light intensities of the first light source and the second light source.

SUMMARY

To at least partly fulfill the above need, the present disclosure seeks to provide an improved way of controlling both the luminous flux, color temperature and/or output color of the combined light from a plurality of light sources. To achieve this, a controller for a lighting system, a lighting system and a method of operating a lighting system as defined in the independent claims are provided. Further embodiments of the present disclosure are provided in the dependent claims.

According to a first aspect of the present disclosure, a controller for a lighting system is provided. The controller may be connectable to a plurality of light sources (of the lighting system) which may have different colors (e.g. different output frequencies) and/or different color temperatures (CTs). The plurality of light sources may for example be LEDs, but it is envisaged that also other light sources (such as e.g. incandescent lights) may be used instead, or in addition. The controller may further be connectable to a user control element. The user control element may be configured to generate a user selected value from a range of user selectable values. The user control element may for example be operable (by a user) to a plurality of selectable values/points/positions, each representing one value within the range of user selectable values. For example, the user control element may allow the user to select from either a finite (discreet) or infinite (and possibly continuous) number of values between (and e.g. including) for example two boundary values. Phrased differently, the plurality of selectable values may range between a corresponding lower value and a corresponding higher value.

The controller may be configured to receive (an indication of) a change of the user selected value from the user control element, e.g. a change of a user selected value from for example a first user selected value to a second user selected value. The change may be indicated to the controller as for example a signal coming from the user control element, or the controller may interrogate (e.g. by measuring) some property (such as e.g. resistance, inductance, conductance, capacitance, etc.) of the user control element from which the user selected value and/or change of user selected value may be deduced.

The controller may be configured to, as a response to and corresponding to the change of the user selected value, adjust a combined output of the plurality of light sources to produce a change in output color, color temperature and/or luminous flux (intensity) of a combined light of the plurality of light sources. The adjustment may be such that, as function of the user selected value in separated first intervals of the user selectable values, the output color and/or color temperature is kept approximately constant while the luminous flux obtains a local minimum or maximum in each first interval. The adjustment may further be such that, as function of the user selected value in at least one second interval of user selectable values in between the first intervals, the output color at least changes from a first color to a second color and/or the color temperature increases or decreases while the luminous flux is kept approximately constant. In this way, the controller is configured to enable an independent adjustment of luminous flux and output color and/or color temperature.

Here, color temperature may correspond to a correlated color temperature (CCT) and be defined with respect to the black body locus/line (BBL, i.e. the "Planckian locus/line"), and the relative output of the plurality of light sources is adjusted such that its color would perceivably most closely be matched by a black body radiator having a temperature equal to the CCT. Phrased differently, the combined light may have a color temperature which more closely matches a black body radiator having the temperature in question than any other black body radiator having a different temperature (i.e., on a chromaticity plot, the combined light may lie on a line perpendicularly intersecting the black body locus at the selected color temperature point, and close enough to the black body locus for the notion of "temperature" to make sense).

Here, output color may correspond to the perceived color of the combined light of the plurality of light sources. For example, one light source may be a red light source, another light source may be a green light source, and a further light source may be a blue light source. By adjusting the relative output of the light sources, a color different from pure red, green or blue may be produced. It is envisaged also that other combination of light sources, with other individual colors, may be used.

Herein, "locally" with regards to the luminous flux means that the corresponding maximum/minimum of the luminous flux is the highest/lowest luminous flux in the corresponding first interval. Preferably, the maximum/minimum is does not occur at the end points of the corresponding first interval, but somewhere between the end points. Phrased differently, the luminous flux is preferably varied according to a non-monotonic function between the end points of the corresponding first interval, in contrast to for example traditional BBL dimming where the intensity is changed according to a monotonically increasing or decreasing function between the end points and as a monotonically increasing or decreasing function with changing color temperature.

With the use of the controller according to the present disclosure, and due to the intensity (i.e. the luminous flux) obtaining a plurality of maxima and minima in first intervals where the color temperature and/or output color is approximately constant, and due to the color temperature increasing or decreasing and/or the output color changing in other, second intervals in between the first intervals, the user may select both the intensity and the output color and/or color temperature of the light "in one go", using only a single control (such as e.g. a single dial, slider, lever, or similar). For example, the intensity may have a local maximum at a color temperature of 4500 K. If the user wants to reduce the intensity (while remaining at least close to 4500 K), the user may use the user control element to adjust the intensity (within the corresponding first interval of user selectable values) while the color temperature remains constant or approximately constant. Likewise, if the intensity would have a local minimum at 4500 K, the user may increase the intensity (while remaining at least close to 4500 K) by using the user control element to move the temperature (slightly) below or above 4500 K. By moving (sweeping) the user selected value across the range of user selectable values generated by the user control element, the user may in this way select between a number of different color temperatures, and for each color temperature also be able to adjust the intensity of the light while remaining approximately at the desired color temperature. The controller thereby provides a more flexible and easy way of adjusting both the intensity and color temperature of light, compared to e.g. controllers and lighting systems which require the user to (separately) specify both a desired intensity and a desired color temperature, using two or more separate controls (e.g. two dials or similar). The same applies also to the output color, which may be changed similarly to the color temperature, such that e.g. the user may select between a plurality of output colors, and be able to adjust the intensity for each output color. This while using only a single control, such as e.g. a single slider, knob, or similar.

In some embodiments, a maximum change in color temperature in the at least one second interval may be between 300 to 600 K, preferably between 400 to 550 K, and more preferably between 450 to 520 K. Phrased differently, these ranges may correspond to the distances between user selectable color temperatures for which the intensity (luminous flux) may be adjusted. These values may correspond well to a user preference.

In some embodiments, the color temperatures in the first intervals may be selected from the group consisting of: 6000 K, 5500 K, 5000 K, 4500 K, 4000 K, 3500 K, 3000 K, 2500 K, and 2000 K. These values may correspond well to the most desired color temperatures for a user. For example, the color temperature in one of the first intervals may be "X" or approximately "X" K. In the next first interval, the color temperature may be "X+500" K or approximately "X+500" K, and so on and so forth.

In some embodiments, the change in color temperature between one first interval and the next may be the same for all "neighboring" (i.e. without any other first interval in between) first intervals, Phrased differently, a spacing between user selectable color temperatures around which the intensity may be adjusted may be equal. An equal spacing may allow the user to vary the intensity at regular intervals.

In some embodiments, a difference in the color temperature between the first intervals may decrease with decreasing color temperature. This may allow the user to have more control of the color temperature at lower temperatures. Likewise, in some embodiments, a difference in the color temperature between the first intervals may decrease with increasing color temperature. This may allow the user to have more control of the color temperature at higher temperatures. Here, "more control" means that there are more color temperature values available around which the user may adjust the intensity (luminous flux).

In some embodiments, the color temperature may be restricted to between 6000 to 2000 K, preferably between 5000 to 2500 K, and more preferably between 4000 to 2700 K. These limits may correspond well to the most desirable ranges for a user. A narrower range of selectable color temperatures may for example reduce the number of available options for the user. For at least some users, this may make operating the user control element in order to adjust the intensity and color temperature and/or output color easier. Here, it may be envisaged that "between" means that also the end values are to be included. For example, a temperature "between T1 to T2" may be also exactly T1 or exactly T2. Herein, it is to be understood that the user really selects a user selectable value, which is then mapped to a specific color temperature according to the functions described herein. In this way, the user indirectly "selects a specific color temperature (and/or output color)".

In some embodiments, an amplitude of the local maximum or local minimum of the luminous flux (or as obtained by the luminous flux when changing the user selected value) may be equal in each first interval.

In some embodiments, an amplitude of the local maximum or local minimum of the luminous flux (or as obtained by the luminous flux) may depend on the color temperature (i.e. on the user selected value), and i.e. be different in different first intervals.

In some embodiments, the maximum intensity in each first interval may be reduced with decreasing color temperature. This may for example allow for a higher intensity at higher color temperature, which may be desirable for the user. For example, decreasing the intensity with decreasing color temperature may help to emulate the behavior of e.g. a dimmed incandescent light bulb, wherein the temperature of the filament is reduced with reduced power supplied to the bulb and the light thereby appearing warmer.

In some embodiments, in each first interval, a maximum luminous flux (intensity) of the combined light may for example be at least two times (that of) a minimum luminous flux, preferably at least three times (that of) the minimum luminous flux, and more preferably at least four times (that of) the minimum luminous flux.

For example, in some embodiments, a maximum luminous flux may be at least 300 lumen (lm), preferably at least 400 lm, and more preferably at least 500 lm. In some embodiments, a minimum luminous flux may be at least 50 lm, preferably at least 100 lm, and more preferably at least 150 lm.

In some embodiments, in each first interval, the luminous flux as a function of the user selected value may be continuous piecewise linear, smooth, rectangular, or have a plurality of plateaus. A sinusoidal function and/or smooth function (such as e.g. a Gaussian type function) may for example provide a gradual increase and decrease of intensity (luminous flux) which may be more gentle for the user. A continuous piecewise linear function may provide a constant change of luminous flux as the user continues to change the user selected value. Rectangular functions may for example provide a clear increase and decrease in luminous flux which may be more easy to control for a user. Functions having multiple plateaus may provide the same effect as rectangular functions, but with more options for setting the desired luminous flux for the user.

If using rectangular functions, a width of a peak/valley may for example be less than a width of a neighboring valley/peak, preferably less than two times the width of the neighboring valley/peak, more preferably less than three times the width of the neighboring valley/peak. If using functions having multiple plateaus, a first plateau of each peak may correspond to the maximum/minimum value of the peak/valley, and e.g. a second plateau of each peak/valley may be at a lower/higher luminous flux value than the first plateau. In some embodiments, a width of the first plateau may be equal to a width of the second plateau. In some embodiments, the combined width of the first plateau and the second plateau (e.g. the full width of the peak/valley) may for example be less than two times a distance to the next peak/valley. In some embodiments, each peak/valley may include also a third plateau, located on the other side of the first plateau compared to the second plateau. In some embodiments, the combined with of the peak/valley (i.e. the sum of the widths of the first, second and third plateaus) may be less than two times a distance to the next peak/valley. In some embodiments, the value of the third plateau may for example be equal to the value of the second plateau.

According to a second aspect of the present disclosure, a lighting system is provided. The lighting system may include a plurality of light sources of different colors and/or different color temperatures (CTs). The lighting system may also include a user control element configured to generate (i.e. be operable to) a user selected value from a range of user selectable values (as described earlier herein). The lighting system may further include a controller as described herein, connected to the plurality of light sources and to the user control element.

The controller may be connected to the user control element using for example a wire. It is also envisaged that the controller may instead (or in addition) be wirelessly connected to the user control element, using for example RF and/or optical communication. In some embodiments, it may be envisaged that the controller and the user control element are provided as separate elements. In some embodiments, it may be envisaged that the controller and the user control element are instead provided as an integrated unit. The controller may be connected to the plurality of light sources either directly (wherein it is envisaged that the controller may include necessary means for driving the plurality of light sources), or indirectly via for example a driving circuit having such means for driving the plurality of light sources. If the controller is not directly connected to the light sources, it may be envisaged that the controller is for example (in addition, or alternatively) connected wirelessly to the driving circuit. In some embodiments, the user control element may for example be a program or application running on a computer or e.g. a smart phone, and the user control element may for example be a physical control connected to such a computer or smart phone, or a graphical element presented on e.g. a screen and on which the user may click and/or drag using for example a finger or other pointing devices (such as a joystick and/or a computer mouse). In some other embodiments, the user control element and the controller may be integrated in for example a lighting switch, or similar.

In some embodiments, the user selectable values may be defined on the user control element itself (e.g. as discreet positions of the user control element, between which the user control element is operable). It is envisaged also that the user selectable values may be defined e.g. by the controller and not by the user control element, for example in software and or by hardware. As an example, it may be envisaged that a resolution of the user control element is greater than a desired resolution/spacing of/between the user selectable values. The controller may then e.g. use only some of the possible user control values to define the user selected value, and/or use e.g. down-sampling/decimation or similar.

In some embodiments, a spacing between the user selectable values may decrease when the user changes the user selected value (e.g. sweeps the user selected value) in one direction, and increase when the user changes the user selected value in another direction. This may for example provide an improved control for the user when adjusting the intensity/color temperature at lower color temperatures, by increasing the resolution in this region. For example, a user may be more sensitive to changes in intensity for light having a lower color temperature, and decreasing the spacing between user selectable values at low color temperature may then increase the user's ability to more accurately fine-tune the intensity (luminous flux).

In some embodiments, it may also be envisaged that the controller may for example take into account a speed with which the user operates the user control element to sweep across the user selectable values. For example, if the controller detects that the speed of sweeping is high, the controller may decide to skip over some of the user selectable values to allow the user to more quickly reach a desired value. Likewise, if the speed of sweeping is detected to be slow, the controller may increase the number of user selectable value such that the accuracy for the user may be increased. In some embodiments, it may be envisaged also that the controller may dynamically adjust the sensitivity (i.e. the spacing between user selectable values/points) at or close to e.g. a peak/valley of the luminous flux (in the first intervals). In other situations, it is envisaged that the controller may instead increase the number of user selectable values if the speed of sweeping is detected to be high, and vice versa, thereby providing a more constant adjustment less dependent on sweeping speed.

In some embodiments, a spacing between the user selectable values may be different closer to midpoints of the first intervals than further away from the midpoints.

In some embodiments, the spacing between the user selectable values may be decreased closer to the midpoints.

The controller may for example reduce the spacing between user selectable values once the user is close to a peak/valley (i.e. local maximum/minimum, to increase the precision/accuracy). The controller may for example also increase the spacing between user selectable values once the user is far away (e.g. in between) any peak/valley, as the luminous flux is most likely to be unchanged (i.e. at least approximately constant) in these regions anyway (such as in or close to the second intervals), requiring less precision/accuracy for the user. It is, in some embodiments, also envisaged that the controller may use also other factors when adjusting e.g. the spacing between user selectable values and/or the spacing between the user selectable values in the intervals of the user selectable values where the peaks/valleys of the luminous flux will be (i.e. in the first intervals), and or the general form of the function according to which the luminous flux changes with the user selected value. The controller may for example receive data from a light sensor, and adjust accordingly such that for example the above features are adjusted differently based on current ambient lighting conditions (e.g. day time or night time, cloudy days, sunny days, etc.). The controller may also for example base its decisions using time of day, or similar.

In some embodiments, the user control element may be selected from the group consisting of: a single dial, a single slider, a single lever, a single button, and a single double-button (e.g. a button with option for "higher color temperature" and one option for "lower color temperature", or e.g. a button with option for "a next output color" or "a previous output color"). As described earlier, the use of the user control element directly changes the user selected value, and only indirectly changes e.g. the luminous flux, color temperature and/or output color by using the functions described herein.

Using only a single control element (e.g. a single button, knob, slider, lever, etc.) may provide the above mentioned advantages, and provide a more flexible and easy way for the user to control both the intensity and color temperature and/or output color of the combined light. If using for example a single button, it may be envisaged that the user selected value (and thereby e.g. the corresponding color temperatures) is cycled, i.e. such that the user selected value (for example for each press on the button, or while the user holds the button pressed) e.g. first increases up until a maximum value, after which it either decreases back towards a minimum value or continues to increase but instead from the minimum value (i.e. "loops back/around"), and so forth. As mentioned earlier herein, the user control element may in some embodiments not be a physical element, but a virtual element (such as a button or dial on a screen) implemented on a computer or smartphone (or tablet, or similar).

According to a third aspect of the present disclosure, a method of operating a lighting system including a plurality of light sources of different colors and/or different color temperatures (CTs) is provided. The method may include changing, using a user control element configured to generate (i.e. being operable to) a user selected value from a range of user selectable values. The method may include adjusting, using a controller configured to receive an indication of the change of the user selected value and as a response to and corresponding to said change, a combined output of the plurality of light sources to produce a change in output color, color temperature and/or luminous flux (intensity) of a combined light of the plurality of light sources. This changing may be such that, as function of the user selected value in separated first intervals of the user selectable values, the output color and/or color temperature is kept approximately constant while the luminous flux obtains a local minimum or local maximum in each first interval, and such that, as function of the user selected value in at least one second interval of the user selectable values in between the first intervals, the output color changes from a first color to a second color and/or the color temperature increases or decreases while the luminous flux is kept approximately constant.

According to a fourth aspect of the present disclosure, a lamp is provided. The lamp may include a plurality of light sources of different colors and/or color temperatures (CTs), and a controller as described herein for adjusting, as also described herein, the color temperature, the output color and/or the luminous flux (intensity) of the combined light output from the plurality of light sources based on a received (change of a) user selected value.

According to a fifth aspect of the present disclosure, a luminaire is provided. The luminaire may be arranged to receive e.g. a lamp as described with reference to the fourth aspect, and/or a plurality of light sources of different colors and/or color temperatures (CTs), and further include a controller as described herein for, as also described herein, adjusting the color temperature, output color and/or luminous flux (intensity) of the combined light output from the plurality of light sources based on a received (change of a) user selected value.

Advantages and features of the controller according to the first aspect, and the lighting system according to the second aspect, applies just as well to the method according to the third aspect, the lamp of the fourth aspect and the luminaire of the fifth aspect, and vice versa. The present disclosure relates to all possible combinations of features as recited e.g. in the claims. Further objects and advantages of the various embodiments of the present disclosure will be described below by means of one or more exemplifying embodiments.

BRIEF DESCRIPTION OF THE DRAWINGS

Exemplifying embodiments will be described below with reference to the accompanying drawings, in which.

Figure 1:
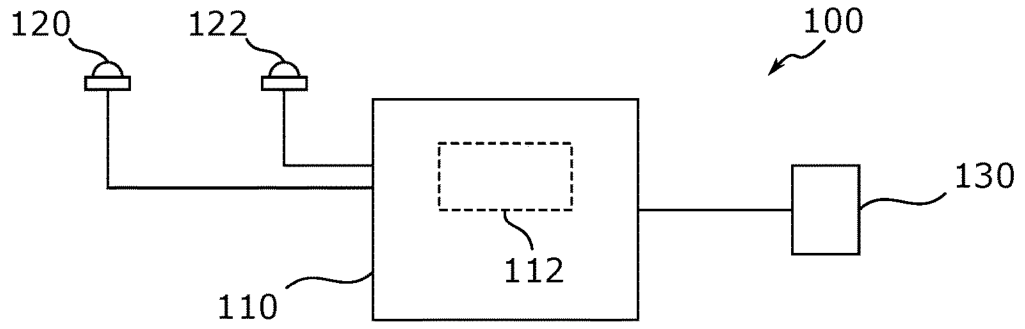
FIG. 1 illustrates schematically an embodiment of a controller and a lighting system according to the present disclosure.

In the drawings, like reference numerals will be used for like features or elements unless stated otherwise. For different examples of a same feature or element "X", various alternatives will be denoted "X-Y" where "Y" may change for each alternative. Unless explicitly stated to the contrary, the drawings show only such elements that are necessary to illustrate the example embodiments, while other elements, in the interest of clarity, may be omitted or merely suggested. As illustrated in the figures, the sizes of elements and regions may not necessarily be drawn to scale and may e.g. be exaggerated for illustrative purposes and, thus, are provided to illustrate the general structures of the embodiments.

DETAILED DESCRIPTION

Exemplifying embodiments will now be described more fully hereinafter with reference to the accompanying drawings. The drawings show currently preferred embodiments, but the invention may, however, be embodied in many different forms and should not be construed as limited to the embodiments set forth herein; rather, these embodiments are provided for thoroughness and completeness, and fully convey the scope of the present disclosure to the skilled person.

With reference to FIG. 1, a controller and a lighting system according to the present disclosure will now be described in more detail.

FIG. 1 illustrates schematically an embodiment of a lighting system 100 and a controller 110. The controller 110 forms part of the lighting system 100, but the present disclosure also relates to the controller 110 as a separate part.

The lighting system 100 further includes a plurality of light sources, including LEDs 120 and 122. Although FIG. 1 only shows two light sources, it is envisaged that more than two light sources may be included in the lighting system 100. The controller 110 is connected to the LEDs 120 and 122 via an internal driving circuit 112 (which may provide sufficient power to drive the LEDs 120 and 122). As previously described herein, it is envisaged that, in other embodiments, the controller 110 and the driving circuit 112 may be provided as separate units, and that the controller 110 may for example use a wired or wireless connection to communicate with the driving circuit 112.

The LEDs 120 and 122 may for example be white LEDs having different color temperatures $T_1$ and $T_2$. One of these temperatures may for example correspond to a lower color temperature, and the other one of these temperatures may for example correspond to a higher color temperature. By adjusting the relative power supplied to each LED 120 and 122, a combined light having a color temperature ranging from $T_1$ (in case only the LED 120 is provided with power) to $T_2$ (in case only the LED 122 is provided with power) may be provided. If additional LEDs are included, especially LEDs having colors such as e.g. blue, red or green, the color temperature of the combined light of all the LEDs may be further adjusted. For example, by providing, in addition to the light from the LEDs 120 and 122, light from a blue LED, the color temperature of the output light may be made more blueish (i.e. colder). Likewise, by adding light from a red LED, the color temperature of the output light may be made more reddish (i.e. warmer). It is of course envisaged that other combinations of LEDs (of various colors) may be used to provide a light having a controllable color temperature. For example, if LEDs having different colors are used, it may also be possible to change not only the color temperature of the combined light, but also, or instead, the output color of the combined light. As an example, LEDs having red, green and blue light may be used, and their respective powers may be adjusted to produce any output color available from various combinations of these three colors.

The lighting system 100 further includes a user control element 130 which is connected (or connectable) to the controller 110 using e.g. a wired or wireless connection. The user control element 130 is operable (by the user) to a plurality of selectable (different) user values, and the user may operate the user control element 130 to select a user selected value. Using the wired or wireless connection, the controller 110 may receive an indication of the user selected value, and in particular an indication of a change of the user selected value (e.g. if/when the user uses the user control element 130 to change the user selected value from a first user selected value to a second user selected value), and adjust the relative output of the LEDs 120 and 122 as described above to produce (change in) an output color, color temperature and/or luminous flux of a combined light corresponding to the (change of) the user selected value. The user selected value, and/or the change in the user selected value, may for example be communicated from the user control element 130 as a signal, or the user control element 130 may change one or more of its properties (such as resistance, conductance, capacitance, inductance, etc.) such that the controller 110 may interrogate this property and determine the (change in) user selected value.

In addition to controlling the color temperature, the controller 110 may adjust also the total intensity of the combined light output from e.g. the LEDs 120 and 122 based on the user selected value.

As will be described with reference to FIGS. 2*a* to 2*g*, the controller 110 may, in response to the change in the user selected value (using the user control element 130) perform the adjustment of the combined light such that the color temperature, output color and/or luminous flux of the combined light follows one or more functions of the user selected value.

Figure 2A:
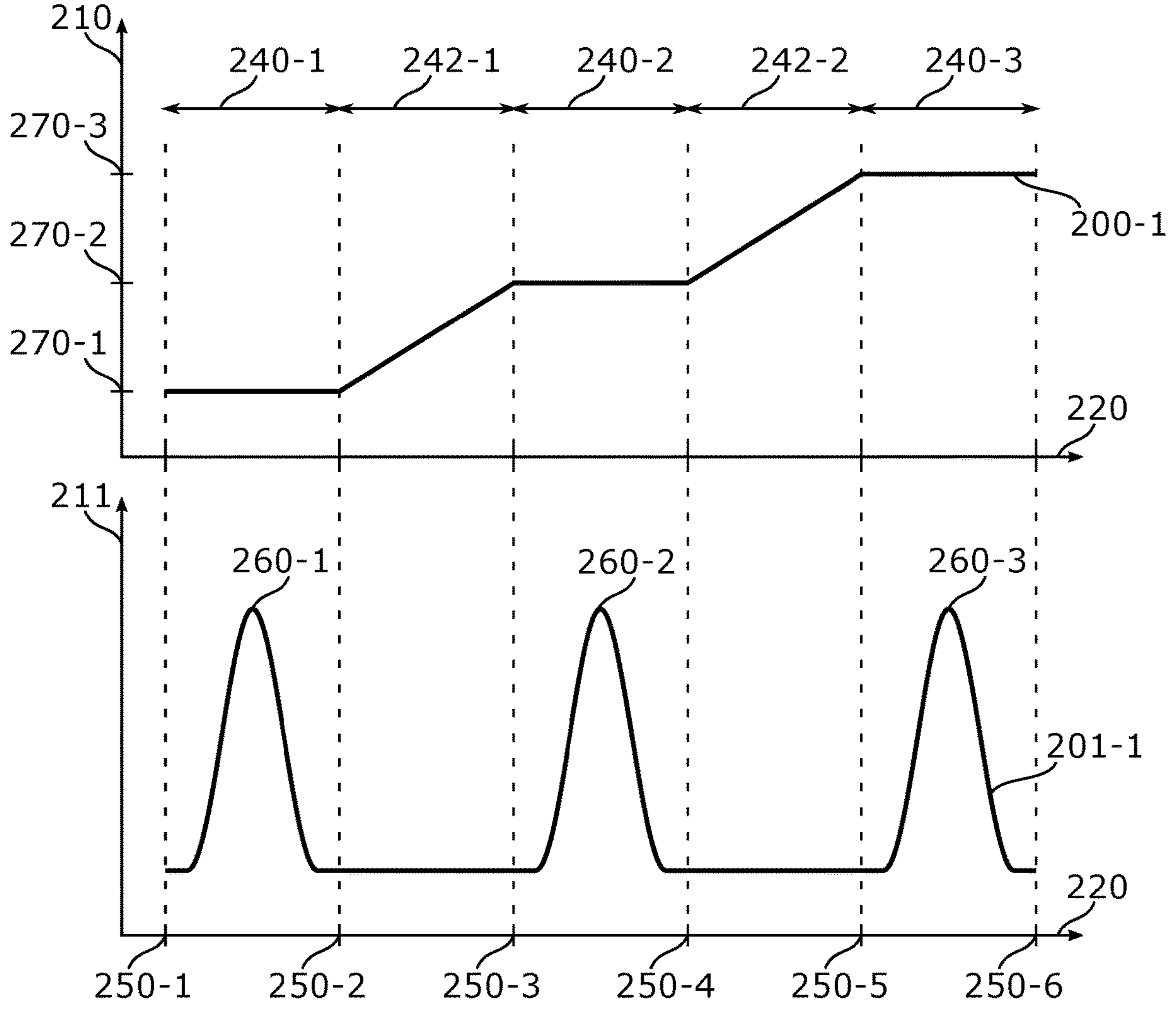
FIGS. 2*a* to 2*g* illustrate schematically the luminous flux and color temperature and/or output color as functions of a user selected value in an embodiment of a controller according to the present disclosure.

FIG. 2*a* illustrates schematically how the color temperature 210 and luminous flux 211 change as functions 200-1 and 201-1, respectively, of the user selected value 220 in one embodiment of a controller according to the present disclosure. In separated first intervals 240-1, 240-2, 240-3 of the user selected value 220, the functions 200-1 and 201-1 are such that the color temperature 210 is kept approximately constant, while the luminous flux 211 obtains a respective local maximum 260-1, 260-2, 260-3 in a corresponding first interval 240-1, 240-2, 240-3. In second intervals 242-1, 242-2 in between the first intervals 240-1, 240-2, 240-3, the functions 200 and 201 are such that the color temperature 210 increases as a function of the user selected value 220 while the luminous flux 211 is kept approximately constant.

The first intervals and the second intervals are defined by the respective values 250-1 to 250-6, as shown in FIG. 2*a*. When the user changes the user selected value 220 between the value 250-1 and the value 250-2, the color temperature 210 is kept approximately constant at the color temperature 270-1, while the luminous flux 211 increases, reaches the local maximum 260-1 and then decreases again. This allows the user to, in the first intervals, remain at a constant or approximately constant color temperature while being able to adjust the luminous flux 211 as desired. When the user changes the user selected value 220 between the value 250-2 and the value 250-3, the color temperature 210 changes between the color temperature 270-1 and the color temperature 270-2, here in a linear fashion (it is envisaged also that the change may be other than linear). Meanwhile, the luminous flux 211 is kept approximately constant. This allows the user to, in the second interval(s), change the desired color temperature 210 without affecting the luminous flux 211. As illustrated in FIG. 2*a*, the luminous flux 211 is kept at a low level within the second intervals 242-1, 242-2. It may be envisaged that for example the luminous flux 211 is zero in these second intervals, or at least that the luminous flux 211 is much less than e.g. its value on one of the local maxima 260-1, 260-2, 260-3. For example, it may be envisaged that e.g. the value of the luminous flux 211 at the peak 260-1 is about two times larger than the value of the luminous flux 211 in the second interval 242-1. It may be envisaged also that the difference is more than so, e.g. about three times larger, or even four times larger or more.

This makes that the controller 110 is configured to enable an independent adjustment of luminous flux 211 and output color or color temperature 210. As shown in for instance FIG. 2*a* the first intervals 240-1, 240-2, 240-3 and the second intervals 242-1, 242-2 are arranged in an alternate way, therewith enabling an adjustment of the output color or color temperature at a given level of the luminous flux.

If the user continues to change the user selected value 220 towards the value 250-6, the color temperature will once again be kept approximately constant at the color temperature 270-2 while the luminous flux once again increases, reaches the peak 260-2 and then decreases again. When moving from the value 250-4 to the value 250-5, the color temperature 210 will change (linearly) to a color temperature 270-3, while the luminous flux 211 is once again approximately constant, and so on and so forth.

As will now be described, it is of course envisaged also that the functions 200 and 201 may have different forms than those illustrated in FIG. 2*a*, as long as the main principle of the controller according to the present disclosure is maintained. This main principle is that in some intervals, the color temperature is kept approximately constant while the luminous flux obtains local minima/maxima, and that in some other intervals there in between it is instead the color temperature that changes (increases or decreases) while the luminous flux is kept approximately constant.

Figure 2B:
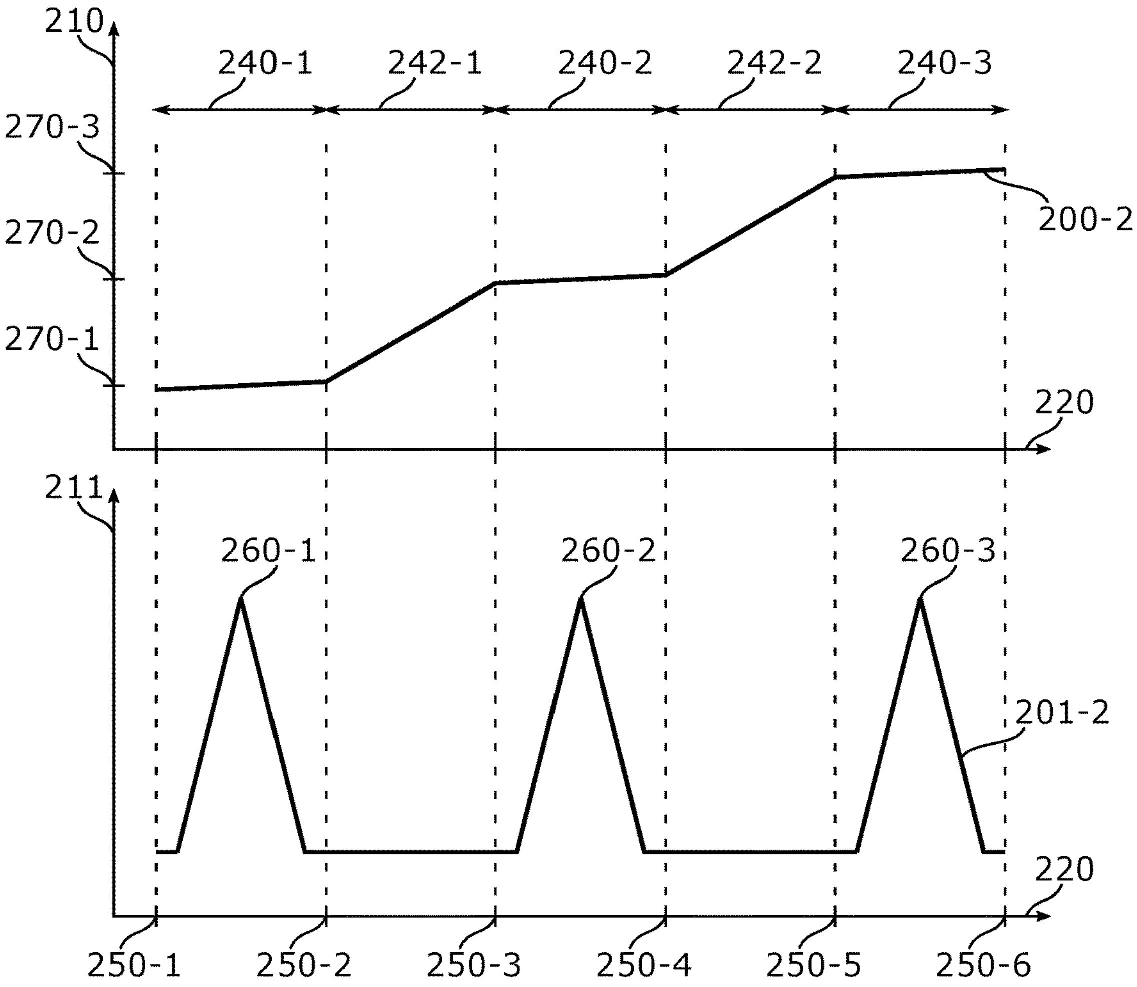

FIG. 2*b* illustrates schematically some alternative forms of the functions 200-2 and 202-1, respectively, for the color temperature 210 and the luminous flux 211 as depending on the user selected value 220. In the embodiment of the controller wherein the adjustment is such as illustrated in FIG. 2*b*, the luminous flux 211 changes in a piecewise linear fashion within the first intervals 240-1, 240-2, 240-3. Also, in contrast to the embodiment of the controller described with reference to FIG. 2*a*, the color temperature 210 is not completely constant within the first intervals 240-1, 240-2, 240-3, but has a slight slope. Such a situation is still to be considered as the color temperature 210 being approximately constant in these regions, as long as the slope is small compared with e.g. the slope of the color temperature 210 within the second regions 242-1, 242-2.

In addition to the embodiments described with reference to FIGS. 2*a* and 2*b*, it is envisaged that also many other shapes of the functions for the color temperature and the luminous flux may be used. Some alternative functions according to various embodiments will be described with reference to FIGS. 2*c* to 2*g*. It is to be noted that each of the different forms of the functions for the color temperature 210 depending on the user selected value 220, as described and disclosed herein, may be combined with each of the different forms of the functions for the luminous flux 211 depending on the user selected value 220, as also described and disclosed herein, to obtain further embodiments which are also considered to form part of the present disclosure.

Figure 2C:
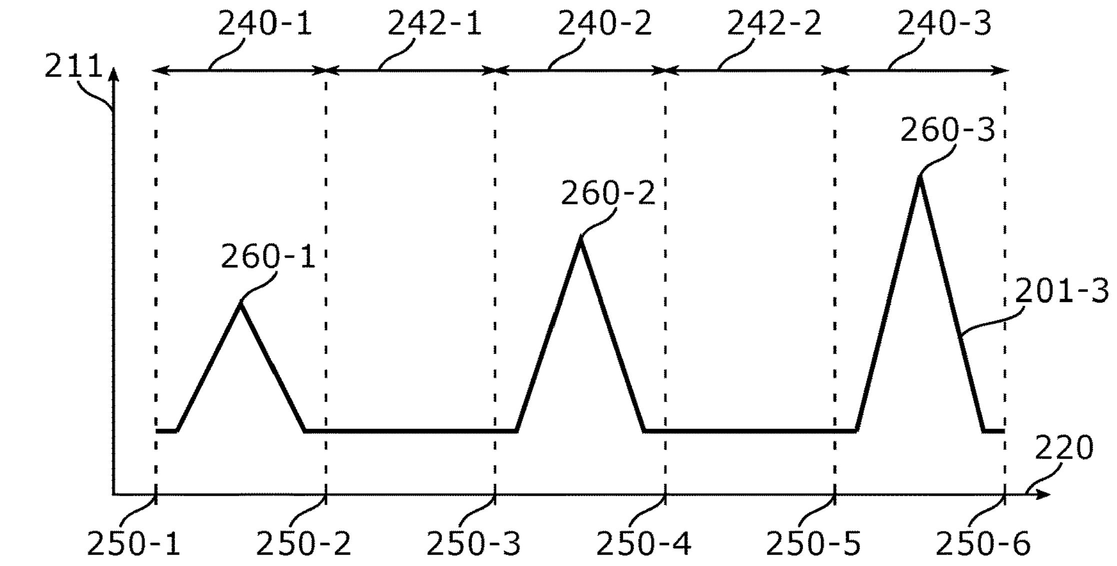

The intensity of the luminous flux 211 at the various local maxima 260-1, 260-2, 260-3, may for example change as a function of the color temperature 210 (i.e. as a function of the user selected value 220). As illustrated in FIG. 2*c*, the luminous flux 211 may for example change such that its local maximum amplitude in each first interval decreases with decreasing color temperature. In an embodiment as illustrated in FIG. 2*c*, the local maximum 260-1 has a lower amplitude than the local maximum 260-2, which in turn has a lower amplitude than the local maximum 260-3. Such a configuration may for example help to emulate the dimming of an incandescent light bulb, wherein a temperature of the filament of the bulb is reduced when less power is provided to the filament (when reducing the intensity/luminous flux), which make the light appear warmer (i.e. having a lower color temperature). It is of course envisaged also that all local maxima (i.e. the peaks in luminous flux 211) have equal amplitude, or for example that the amplitude of the local maxima/minima instead increases with decreasing color temperature.

Figure 2D:
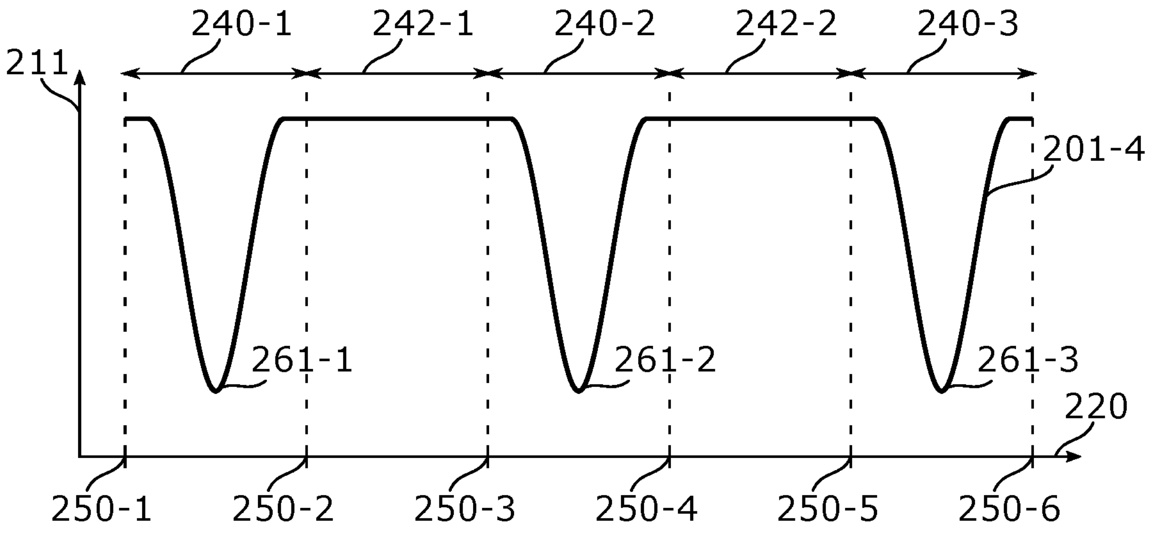

In some embodiments, as illustrated in FIG. 2*d*, the luminous flux 211 as a function 201-4 of the user selected value 220 may obtain local minima 261-1, 261-2, 261-3 within the first intervals 240-1, 240-2, 240-3. Such a configuration may for example be more preferable in a situation wherein the desired luminous flux of the combined light is low or rather low (such as for example in a bed room, a cinema room, or similar where low or rather low intensities of the combined light may be desired).

Figure 2E:
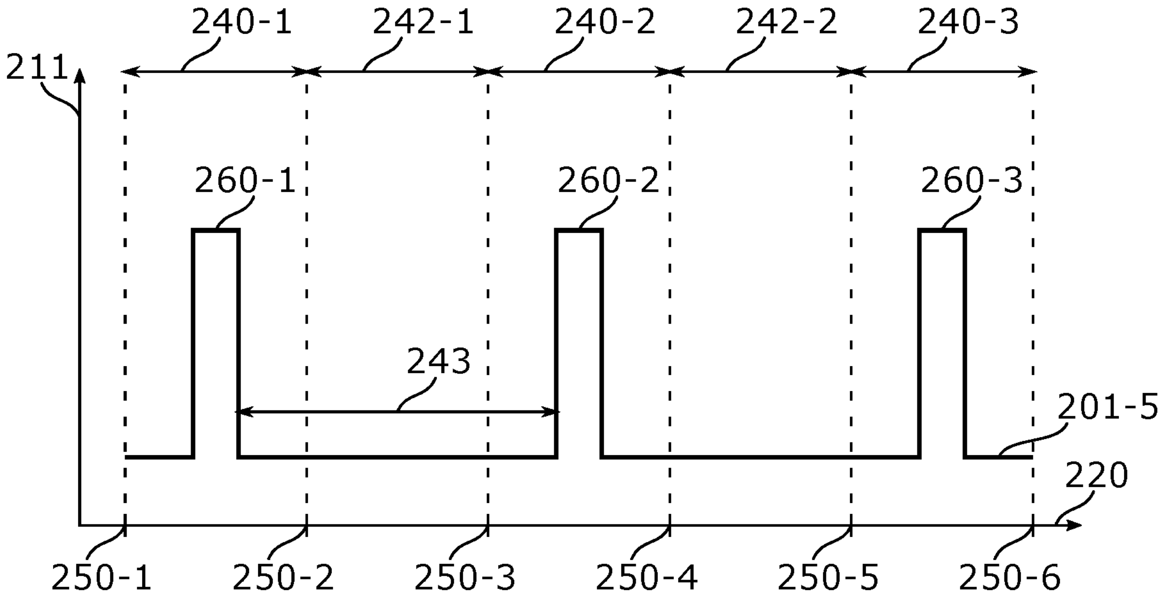

In some embodiments, as illustrated in FIG. 2*e*, the luminous flux 211 as a function 201-5 of the user selected value 220 may be rectangular, such that the respective local maxima 260-1, 206-2, 260-3 occurs not at a single point but over a finite range within each first interval 240-1, 240-2, 240-3. A spacing 243 between the peaks may be equal, but it is of course envisaged also that the spacing between neighboring peaks may vary, for example as a function of the user selected value 220 or the corresponding color temperature (not shown). A width of a peak, e.g. the plateau at 260-1, may for example be less than two times a spacing 243 between two nearby rectangular peaks. The width of a peak may, in other embodiments, for example be less than two times the spacing 243, or less than e.g. three times a width of the spacing 243. Using rectangular peaks may provide a more distinct change in luminous flux as the user changes the user selected value 220. This may provide a more easy usage of the controller for the user. In FIG. 2*e*, the sides of the peaks are illustrated as having vertical sides, but it is envisaged also that the sides may have a finite slope instead of being completely vertical.

Figure 2F:
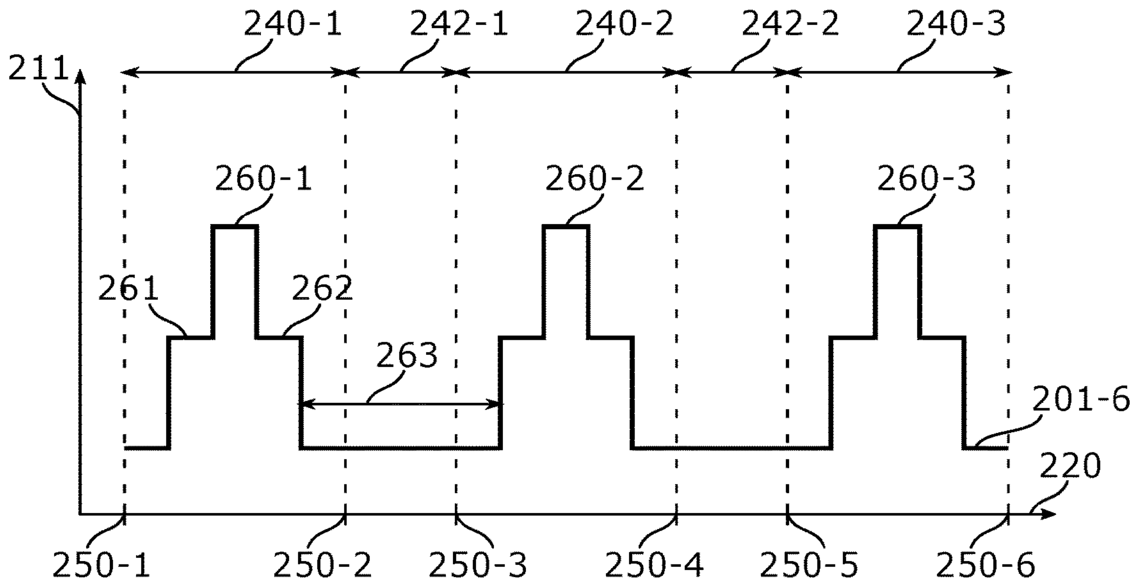

In some embodiments, as illustrated in FIG. 2*f*, the luminous flux 211 as a function 201-6 of the user selected value 220 also includes rectangular peaks, but with additional plateaus 261, 262 on each peak/local maximum. A width of the top plateau 260-1 may for example be equal to a width of the additional plateaus 261, 262. In other embodiments, a width of the top plateau 260-1 may for example be different from one or both of the additional plateaus 261, 262. In some embodiments, the combined width of a peak (e.g. the sum of the widths of the plateaus 260-1, 261 and 262) may be less than for example two times a spacing 263 between one peak and the next one. Using peaks with additional plateaus may still offer the advantage as described with reference to the function 201-5 in FIG. 2*e*, but with further options for the user in terms of the achievable luminous flux values of the combined light. Although FIG. 2*f* illustrates each peak as having three plateaus, it is envisaged also that the peaks may have fewer, e.g. two, plateaus, or more than three plateaus. It is envisaged also that the heights of the various plateaus may not be the same for each peak, and/or also that the number of plateaus on each peak may be different for different peaks.

Figure 2G:
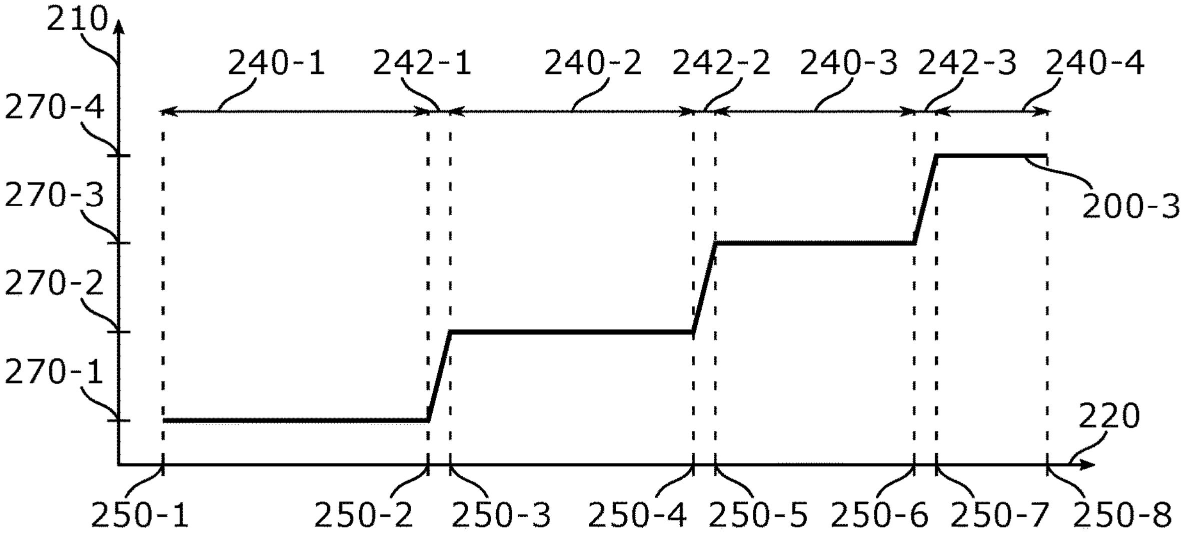

In some embodiments, as illustrated in FIG. 2*g*, the color temperature 210 as a function 200-3 of the user selected value 220 may change more abruptly from one color temperature (e.g. 270-1) to the next one (e.g. 270-2). This may be achieved e.g. by reducing the width of the second intervals 242-1, 242-2, 242-3, etc. Reducing the width(s) of the second intervals may for example allow more of the user selectable values to be available for the variation of the luminous flux 211. In an embodiment as illustrated in FIG. 2*g*, the width of a first interval changes as a function of the user selected value 220 (or implicitly as a function of the color temperature 210). In FIG. 2*g*, the function 200-3 is such that the interval 240-2 is narrower than the interval 240-1, the interval 240-3 is narrower than the interval 240-2, and so on. Such a configuration, wherein the spacing in user selected value between two constant or approximately constant color temperatures 210 changes with user selected value, may for example allow for more user selectable values to be available for changes at lower color temperatures (e.g. at "warmer light"), where the user may be more sensitive to changes. In some embodiments, it is envisaged that also the distance between the color temperatures 270-1, 270-2, etc., may depend on the user selected value 220. For example, it is envisaged that the distance between two neighboring color temperatures decreases or increase with increasing color temperature 210 (i.e. with increasing user selected value 220).

Herein, the color temperature has been illustrated as increasing with increasing user selected value. It is, however, to be understood that the opposite may also be the case, such that the color temperature instead decreases with increasing user selected value. More generally, the "user selected value" may not necessarily be a "number" itself, but at least some quantity which may be mapped in such a way that a change in the user selected value causes a change in color temperature (and/or output color) and luminous flux as described herein.

It is of course envisaged that the various embodiments illustrated herein with reference to FIGS. 2*a* to 2*g* may be combined to create further functions describing the color temperature 210 and luminous flux 211 as functions of the user selected value 220. It should also be understood that if e.g. only the color temperature 210 has been illustrated as having various first and second intervals (in a figure showing only the color temperature and not the luminous flux as function of the user selected value), those first and second intervals apply also for the corresponding luminous flux 211 as function of the user selectable value 220. Likewise, although FIGS. 2*b* to 2*f* show only three separated first intervals 240-1, 240-2, 240-3 and two second intervals 242-1, 242-2 therebetween, it is envisaged also that more first and second intervals may be provided (such as illustrated in FIG. 2*g*, wherein there are four first intervals 240-1 to 240-4 and three second intervals 242-1 to 242-3). In some embodiments, there may also be fewer intervals, e.g. two separated first intervals and one second interval.

Although the embodiments described herein with reference to FIGS. 2*a* to 2*g* focus on color temperature and not output color, it is envisaged that similar functions may be provided also for the output color of the combined light. The output color may for example be changed similarly to the color temperature. Using FIG. 2*a* as an illustrative example, embodiments may be envisaged wherein the output color is kept constant at a first color 270-1 in the first interval 240-1, changes to a second color 270-2 within the second interval 242-1, is kept constant at the second color 270-2 in the first interval 240-2, and so on. Other functions for the output color are also envisaged. The output color may be found e.g. from a one-dimensional mapping array, wherein each element of such an array corresponds to a specific color. The output color as a function of the user selected value 220 may then be illustrated in a similar fashion as the color temperature 210, e.g. such as illustrated in FIGS. 2*a* to 2*g*, wherein the quantity plotted on the axis 210 is then e.g. an index variable to such an array.

Various examples of envisaged user control elements will now be described in more detail with reference to FIGS. 3*a*, 3*b* and 3*c*.

Figure 3A:
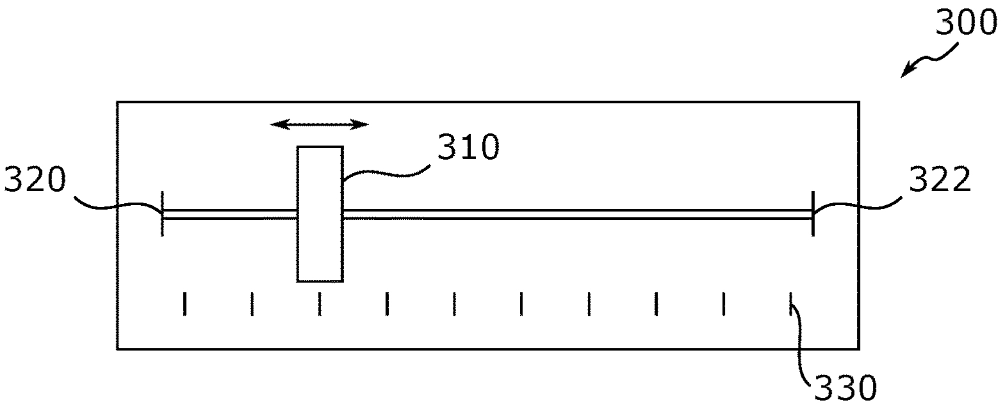
FIGS. 3*a* to 3*c* illustrate schematically various embodiments of a user control element according to the present disclosure.

FIG. 3*a* illustrates schematically a user control element 300 having a single slider 310. The slider 310 may be operable by a user to a plurality of user selectable values ranging between a high/higher value 320 and a low/lower value 322. The slider 310 may be movable in discreet steps, such that there is a finite number of selectable values. By moving the slider 310, the use may sweep across the plurality of user selectable values. It is envisaged also that the slider 310 may be continuously movable between the high and low values 320 and 322, such that an infinite (or at least large) amount of user selectable values exist. The user control element 300 may for example be provided with markings 330. The markings 330 may for example correspond to the discreet user selectable values (if available), and/or to for example midpoints of the separated first intervals in which the luminous flux of the combined light (as controlled by the controller) will obtain the local maxima and/or minima described herein, and/or midpoints of the second intervals wherein the output color and/or color temperature changes. In other embodiments, the markings 330 may for example correspond to the user selectable values 250-1, 250-2, etc. serving as endpoints of the respective first and second intervals. Using FIG. 2*a* as an illustrative example, the marking corresponding to the value 320 may for example correspond to the user selectable value 250-1 in FIG. 2*a*, the next one of the markings 330 may correspond to the user selectable value 250-2, and so on. Instead of lines, the markings 330 may for example be numbers, or text elements telling e.g. the corresponding output color and/or color temperature to the user of the user control element 300. The spacing between markings need not be equal, and if for example a spacing between local maxima and/or minima of the luminous flux changes with the user selected value, the spacing between corresponding markings may be adapted accordingly. In other embodiments of a user control element according to the present disclosure, each user selectable value may have its own corresponding marking.

Figure 3B:
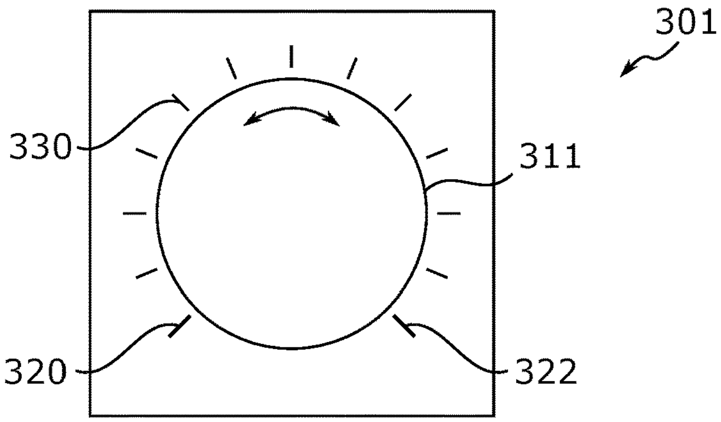

FIG. 3*b* illustrates schematically a user control element 301 having a single dial/knob 311. As for the slider 310 described with reference to the embodiment illustrated in FIG. 3*a*, the dial/knob 311 may be rotatable in discreet or continuous steps. By rotating the dial/knob 311, the user may sweep across the plurality of selectable values. The user control element 301 may also be provided with markings 330 indicating the various selectable values. Instead of having a high and low value, the dial/knob may be of the "infinity type", e.g. such that the user may rotate the dial/knob any number of turns. It is envisaged, in such a situation, for example that the color temperature (or rather, the user selected value) may be increased when the user turns the dial/knob in one direction, and decreased when the user turns the dial/knob in the other direction. It is also envisaged that in some embodiments, the user selected value may jump back to either a predefined maximum/minimum value once the user selected value exceeds/goes below this predefined minimum/maximum value. It is envisaged also that in some embodiments, the user selected value may be limited by some lower and some higher value, for example the lower value and the higher value discussed earlier herein.

Figure 3C:
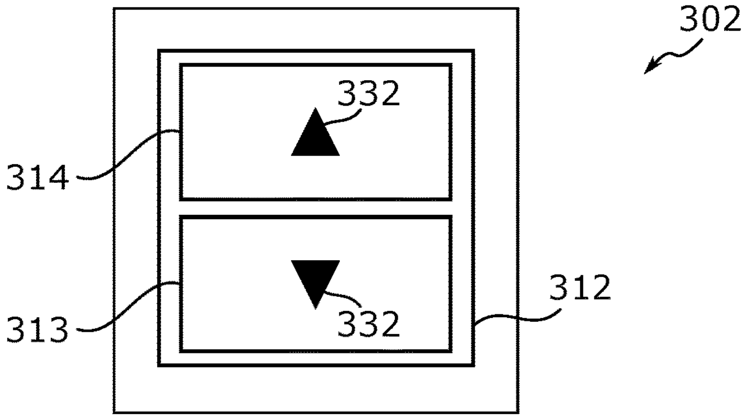

FIG. 3*c* illustrates schematically a user control element 302 having a single double-button 312. The double-button includes a first button 313 and a second button 314. The user may for example decrease the user selected value by pressing one of the first and second buttons 313 and 314, and for example increase the user selected value by pressing the other one of the first and second buttons 313 and 314. Markings 332 may for example be provided on the buttons to indicate which button does what. An increase/decrease of the user selected value may for example occur each time the user presses the corresponding button. It may also be envisaged that an increase/decrease for example steadily occurs while the user keeps a corresponding button pressed down. By repeated clicks on the buttons, or by e.g. holding down a button, the user may sweep across the plurality of user selectable values.

In user control elements (and/or controllers) within the scope of the present disclosure, as described earlier herein, it may also be envisaged that the user control element (and/or the controller) may provide a change in user selected value per physical movement of the user control element which is different in different regions of selectable values. Here, a "physical movement" may e.g. be a rotating of a dial, sliding of a knob, pulling on a lever, the number of clicks on a button, the time of pushing down a button, or similar. If for example using a slider, a change in user selected value per physical movement may be defined as e.g. a change in user selected value per millimeter movement of the slider. For a rotating dial, the change in user selected value per physical movement may be defined as e.g. a change in user selected value per degree of rotation of the dial, and so on and so forth. In one region corresponding to user selectable values at or close to e.g. a corresponding luminous flux peak/valley, such a change in user selected value per physical movement may be reduced to obtain an improved control. In other regions corresponding to user selectable values away from a luminous flux peak/valley, the change in user selected value per physical movement may be increased to obtain a quicker sweep between peaks/valleys. Other similar adjustments depending on specific regions are also envisaged. The user control element may be physically constructed to report different "changes per physical movement" depending on where the user control element (or rather, the user selected value) is currently at. In other embodiments, the controller may instead (or in addition) be used to obtain the same effect. For example, instead of reporting an actual value of the user selected value, the user control element may instead e.g. generate a pulse every time the user changes e.g. a knob/dial/lever with more than a certain amount. Using e.g. optical or magnetic encoding or similar, the user control element may for example output a pulse for every millimeter a slider knob is moved, or for every degree a rotary knob is turned, or similar. The controller may then count the number of pulses to determine the current user selected value, and e.g. with what speed the user is currently sweeping the user selected value across the plurality of selectable values. Further alternatives, using e.g. quadrature modulation, or various other types of encoders for, or other physical means of implementation of, the user control element are also envisaged. It is, of course, also envisaged that reported change of user selected value per physical movement may be the same all over the operable range of the user control element.

Figure 4:
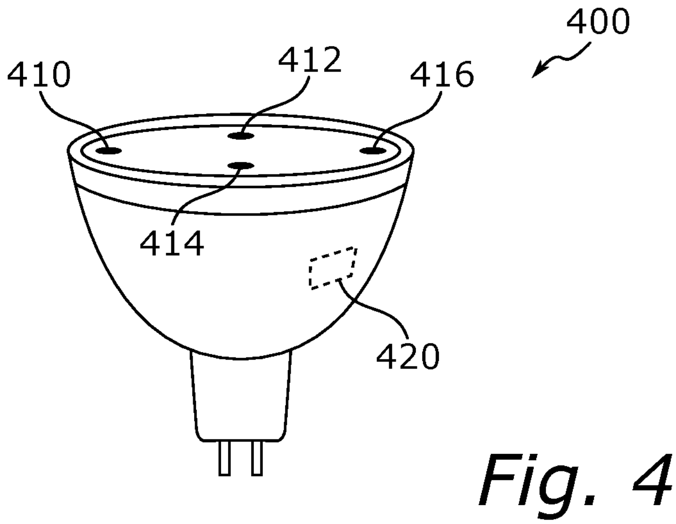
FIG. 4 illustrates schematically an embodiment of a lamp according to the present disclosure.

With reference to FIG. 4, a lamp according to the present disclosure will now be described in more detail.

FIG. 4 illustrates schematically an embodiment of a lamp 400. The lamp includes a plurality of light sources (in the form of LEDs 410, 412, 414 and 416) which have different colors and/or color temperatures. The lamp further includes a controller 420 as described herein, and the controller is connected to the plurality of light sources 410, 412, 414 and 416 and adapted to receive (e.g. from a wire or using a wireless link) an indication of a user selected value. The controller 420 is then, as described herein, configured to adjust a relative output of the plurality of light sources in order to match a color temperature (e.g. a CCT) of the combined light to (a change in) the user selected value. Further, as also described herein, the controller is configured to adjust the intensity or luminous flux of the combined light in response to the user, using a user control element, sweeping (or changing) the user selected value across a plurality of selectable values, by varying the luminous flux as functions of the user selected value as described herein e.g. with reference to FIGS. 1, 2*a*-2*g* and 3*a*-3*c*. Although illustrated as having a dual-pin base, it is envisaged also that the lamp may have other forms and use other bases to connect to e.g. a luminaire or lamp socket, such as for example a screw base, twist lock base, or similar.

Figure 5:
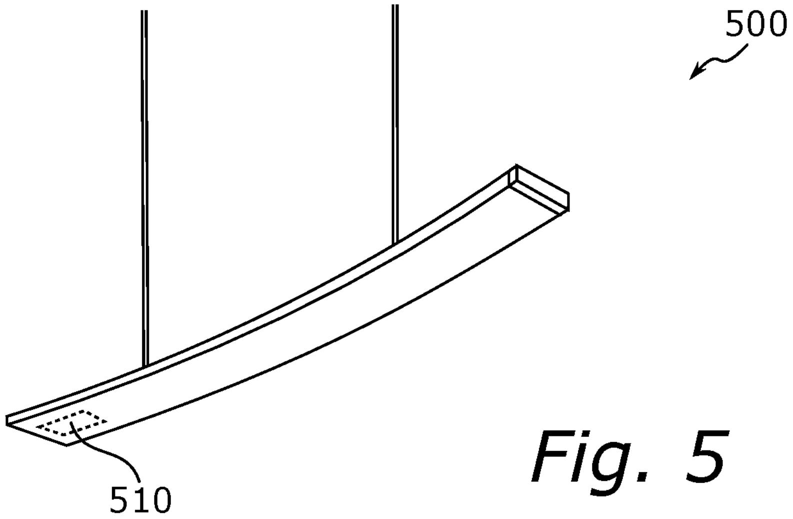
FIG. 5 illustrates schematically an embodiment of a luminaire according to the present disclosure.

With reference to FIG. 5, a luminaire according to the present disclosure will now be described in more detail.

FIG. 5 illustrates schematically an embodiment of a luminaire 500. The luminaire 500 is configured to receive one or more lamps or tubes (not shown), and includes a controller 510 which may be connected to a plurality of light sources (e.g. LEDs) of said lamps or tubes, wherein the light sources have different colors and/or color temperatures (CTs). As already described herein, the controller may adjust both the CT and/or the output color of the combined light from these light sources, and also, based on an indication of a user selected value, vary the luminous flux of the combined light as function of the user selected value (e.g. as described herein with reference to FIGS. 1, 2*a*-2*g* and 3*a*-3*c*) in response to the user sweeping the user selected value across a plurality of selectable values (using a user control element as also described herein).

Figure 6:
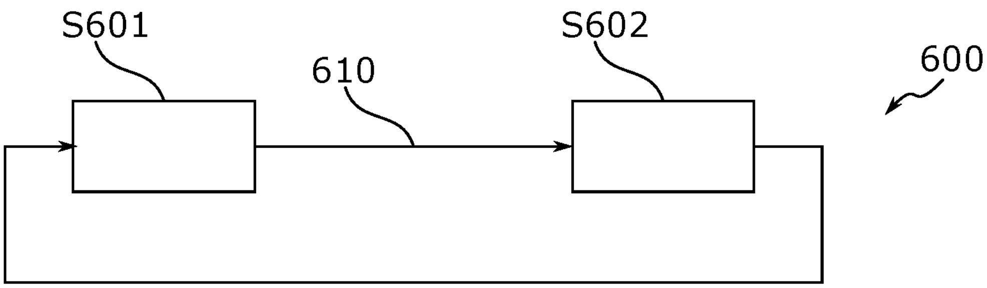
FIG. 6 illustrates schematically a flowchart of an embodiment of a method for operating a lighting system according to the present disclosure.

With reference to FIG. 6, a method of operating a lighting system including a plurality of light sources of different colors and/or different color temperatures (CTs) will now be described in more detail.

FIG. 6 illustrates schematically a flowchart of an embodiment of a method 600. In a step S601, the method awaits the user (using a user control element as described herein) to generate a user selected value from a range of user selectable values. An indication 610 of (a change in) the user selected value 610 is provided to a next step S602, wherein a controller configured to receive the indication 610 adjusts a relative output of the plurality of light sources to produce a combined light having a (correlated) color temperature, output color and/or luminous flux corresponding to the (change in) user selected value 610. The method may then await a further (change in) user selected value, by repeating step S601 such that once again an indication 610 of the further (change in) user selected value may be provided to the controller in step S602, etc.

By allowing the user to sweep the user selected value (using the user control element) across a plurality of selectable values, and by adjusting both the luminous flux and color temperature and/or output color of the provided light as functions of the user selected value, the present disclosure provides an improved, more flexible and more easy way of allowing a user to change the luminous flux/intensity, color temperature and/or output color of the combined light "in one go", requiring the use of only a single control slider, knob, dial, lever, button or similar. The present disclosure thus provides an improvement compared to other e.g. controllers and lighting systems, wherein the user is required to use multiple controls (such as multiple sliders, knobs, dials, levers, buttons, or dials and/or levers combined into single entities, or similar) in order to achieve the same result. It is envisaged that at least the controller and the user control element may be either separate entities, or that they may both form part of a single entity. Both the controller and the user control element may be physical entities, but it is also envisaged that the controller and/or the user control element may be implemented using e.g. software. The controller may for example be implemented using software, and/or the user control element may for example be implemented as a graphical control presented on e.g. a touch screen.

Although features and elements are described above in particular combinations, each feature or element may be used alone without the other features and elements or in various combinations with or without other features and elements.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A controller for a lighting system, connectable to a plurality of light sources of different colors and/or different color temperatures, and connectable to a single user control element configured to generate a user selected value from a range of user selectable values, said user selectable values separated in alternately arranged first intervals and second intervals of the user selectable values, wherein the controller is configured to:

receive, from the single user control element, a change of the user selected value, and as a response to and corresponding to said change of the user selected value, adjust a combined output of said plurality of light sources to produce a change in output color, color temperature and/or a luminous flux of a combined light of the plurality of light sources, such that, as functions of the user selected value in separated first intervals of the user selectable values, the output color and/or color temperature is kept approximately constant while the luminous flux obtains a local minimum or local maximum in each first interval, and as functions of the user selected value in at least one second interval of the user selectable values in between the first intervals, the output color at least changes from a first color to a second color and/or the color temperature increases or decreases while the luminous flux is kept approximately constant and, wherein the controller is configured to enable an independent adjustment of luminous flux and output color and/or color temperature.

2. The controller of claim 1, wherein a maximum change in color temperature in the at least one second interval is between 300 to 600 K, preferably between 400 to 550 K, more preferably between 450 to 520 K.

3. The controller of claim 1, wherein the color temperatures in the first intervals are selected from the group consisting of: 6000 K, 5550 K, 5000 K, 4500 K, 3500 K, 3000 K, 2500 K, and 2000 K.

4. The controller of claim 1, wherein a difference in the color temperature between the first intervals decreases with decreasing color temperature or increases with decreasing color temperature.

5. The controller of claim 1, wherein the color temperature is restricted to between 6000 to 2000 K, preferably between 5000 to 2500 K, more preferably between 4000 to 2700 K.

6. The controller of claim 1, wherein an amplitude of the local maximum or local minimum of the luminous flux is equal in each first interval.

7. The controller of claim 1, wherein, in each first interval, an amplitude of the local maximum or local minimum of the luminous flux depends on the color temperature.

8. The controller of claim 1, wherein in each first interval a maximum luminous flux is at least two times a minimum luminous flux, preferably at least three times the minimum luminous flux, more preferably at least four times the minimum luminous flux.

9. The controller of claim 1, wherein in each first interval the luminous flux as a function of the user selected value is continuous piecewise linear, smooth, rectangular or having a plurality of plateaus.

10. A lighting system including a plurality of light sources of different colors and/or different color temperatures, a user control element configured to generate a user selected value from a range of user selectable values, and the controller of any one of the preceding claims connected to said plurality of light sources and to the user control element.

11. The controller of claim 1, wherein a spacing between the user selectable values decreases when the user changes the user selected value in one direction and increases when the user changes the user selected value in another direction.

12. The controller of claim 1, wherein a spacing between the user selectable values is different closer to midpoints of the first intervals than further away from the midpoints.

13. The controller or lighting system of claim 12, wherein the spacing between the user selectable values decreases closer to the midpoints.

14. The controller of claim 1, wherein the user control element is selected from the group consisting of: a single dial, a single slider, a single lever, a single button, and a single double-button.

15. A method of operating a lighting system including a plurality of light sources of different colors and/or different color temperatures, said method comprising:

changing, using a single user control element configured to generate a user selected value from a range of user selectable values, said user selectable values separated in alternately arranged first intervals and second intervals, adjusting, using a controller configured to receive an indication of the change of the user selected value and as a response to and corresponding to said change, a combined output of said plurality of light sources to produce a change in output color, color temperature and/or luminous flux of a combined light of the plurality of light sources, such that, as functions of the user selected value in separated first intervals of the user selectable values, the output color and/or color temperature is kept approximately constant while the luminous flux obtains a local minimum or local maximum in each first interval, and as functions of the user selected value in at least one second interval of the user selectable values in between the first intervals, the output color changes from a first color to a second color and/or the color temperature increases or decreases while the luminous flux is kept approximately constant and, wherein the controller is configured to enable an independent adjustment of luminous flux and output color and/or color temperature.

* * * * *